(12) United States Patent
Anka

(10) Patent No.: US 8,886,724 B2
(45) Date of Patent: Nov. 11, 2014

(54) NETWORK-BASED QUICK CONNECT MEETING SERVICE

(71) Applicant: LogMeIn, Inc., Boston, MA (US)

(72) Inventor: Marton B. Anka, Windham, NH (US)

(73) Assignee: LogMeIn, Inc., Boston, MA (US)

( * ) Notice: Subject to any disclaimer, the term of this patent is extended or adjusted under 35 U.S.C. 154(b) by 0 days.

(21) Appl. No.: 14/027,269

(22) Filed: Sep. 16, 2013

(65) Prior Publication Data

US 2014/0201282 A1 Jul. 17, 2014

Related U.S. Application Data

(63) Continuation of application No. 12/940,889, filed on Nov. 5, 2010, now Pat. No. 8,539,028.

(51) Int. Cl.
*G06F 15/16* (2006.01)
*H04L 29/06* (2006.01)

(52) U.S. Cl.
CPC .................................. *H04L 65/1069* (2013.01)
USPC .......................................................... 709/204

(58) Field of Classification Search
None
See application file for complete search history.

(56) References Cited

U.S. PATENT DOCUMENTS

| | | | |
|---|---|---|---|
| 5,862,330 A | 1/1999 | Anupam et al. | |
| 5,991,796 A | 11/1999 | Anupam et al. | |
| 6,928,479 B1 | 8/2005 | Meyer et al. | |
| 7,558,862 B1 | 7/2009 | Tyukasz | |
| 7,734,799 B1 | 6/2010 | Anka | |
| 8,086,740 B2 | 12/2011 | Tyukasz | |
| 8,509,410 B2 * | 8/2013 | Liao et al. | 379/202.01 |
| 2003/0112823 A1 | 6/2003 | Collins et al. | |
| 2008/0016155 A1 | 1/2008 | Khalatian | |
| 2009/0164581 A1 | 6/2009 | Bove et al. | |
| 2010/0036929 A1 | 2/2010 | Scherpa et al. | |
| 2010/0174816 A1 | 7/2010 | Piccinini et al. | |
| 2013/0238703 A1 * | 9/2013 | Desai et al. | 709/204 |
| 2013/0238704 A1 * | 9/2013 | Weller et al. | 709/204 |
| 2013/0238705 A1 * | 9/2013 | Weller et al. | 709/204 |

* cited by examiner

*Primary Examiner* — Brian P Whipple
(74) *Attorney, Agent, or Firm* — David H. Judson

(57) ABSTRACT

A network-accessible service enables participating end users to collaborate with one another over a network. End users have computing devices that include hardware and software to enable the device to access a network. The service provides a publicly-available site or a local software application from which a first participating user initiates a "meeting," e.g., by selecting a "share" button. In response, the site or software application provides an HTTP link that includes a "meeting" code, which may be a one-time unique code. The first participating user then shares the link with whomever he or she desires to collaborate. Upon receiving the link, a second participating user joins the meeting "on-the-fly" by simply selecting the link or navigating to the site and entering the "meeting" code. The service connects the second participating user to the meeting immediately and without requiring any registration, software download, or the like.

9 Claims, 4 Drawing Sheets

NETWORK-BASED QUICK CONNECT MEETING SERVICE

BACKGROUND OF THE INVENTION

1. Technical Field

This disclosure relates generally to technologies that enable users of Internet-accessible devices to instantly and easily collaborate with one another over a network and a remote access service.

2. Background of the Related Art

Remote access device products and services are well-known in the prior art. These products and services enable communication with a data processing system from a remote location through a data link. It is also known in the prior art to enable computer users to collaborate with one another over a network, e.g., by display screen sharing, remote access, remote control, file transfer, chat, computer management, and the like.

Products and services that provide these types of capability include, without limitation, LogMeIn Free, LogMeIn Pro, GoToMyPC, WebEx, Adobe Connect, TeamViewer, and others.

While these products and services provide many advantages, they cannot be easily used "on-the-fly" (i.e., on-demand) by participating users because of the requirements that users download and install software, register for the service, accept terms and conditions via one or more dialog boxes, and/or perform other configuration tasks.

BRIEF SUMMARY

A network-accessible service enables participating end users to collaborate with one another over a network. End users have computing devices (e.g., computers, mobile phone, tablet devices, or the like) that include hardware and software to enable the device to access a network, such as the public Internet, a Wi-Fi network connected to the Internet, a 3G or higher wireless network connected to the Internet, a private network, or the like. The network-accessible service provides a publicly-available site (such as a Web site) or a local software application from which a first participating end user initiates a "meeting," e.g., by selecting a "share" button. In response, the site or software application provides an HTTP link that includes a session (or "meeting") code. The meeting code may be a one-time unique code generated when the end user initiates the meeting, a code that has been pre-generated and obtain from a preexisting list, a code that is associated with the user for repeat use, and the like. The first participating end user then shares the link, which serves to package the code, with whomever he or she desires to collaborate. Upon receiving the link (e.g., by e-mail, instant message, SMS, MMS, orally, or the like), a second participating end user joins the meeting "on-the-fly" by simply selecting the link or navigating to the site and entering the "meeting" code (e.g., in a "join" field on the Web site). The service provides an "instant connect" function that connects the second participating end user to the meeting immediately and without requiring any registration, software download, dialog box to click-through, or the like. Upon completing a meeting, participants are provided an option to download the local software application from which (once installed on the local computer) subsequent meetings can be initiated or joined without requiring navigation to the site itself.

Preferably, the actual connectivity between or among the participating end users is provided using a tiered server infrastructure that provides a highly-available, scalable "join meeting" service that is easy to use, highly reliable, and secure.

In an alternative embodiment, the above-described method is performed in an apparatus comprising a processor, and computer memory holding computer program instructions that when executed by the processor perform the method.

In another alternative embodiment, the above-described method is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
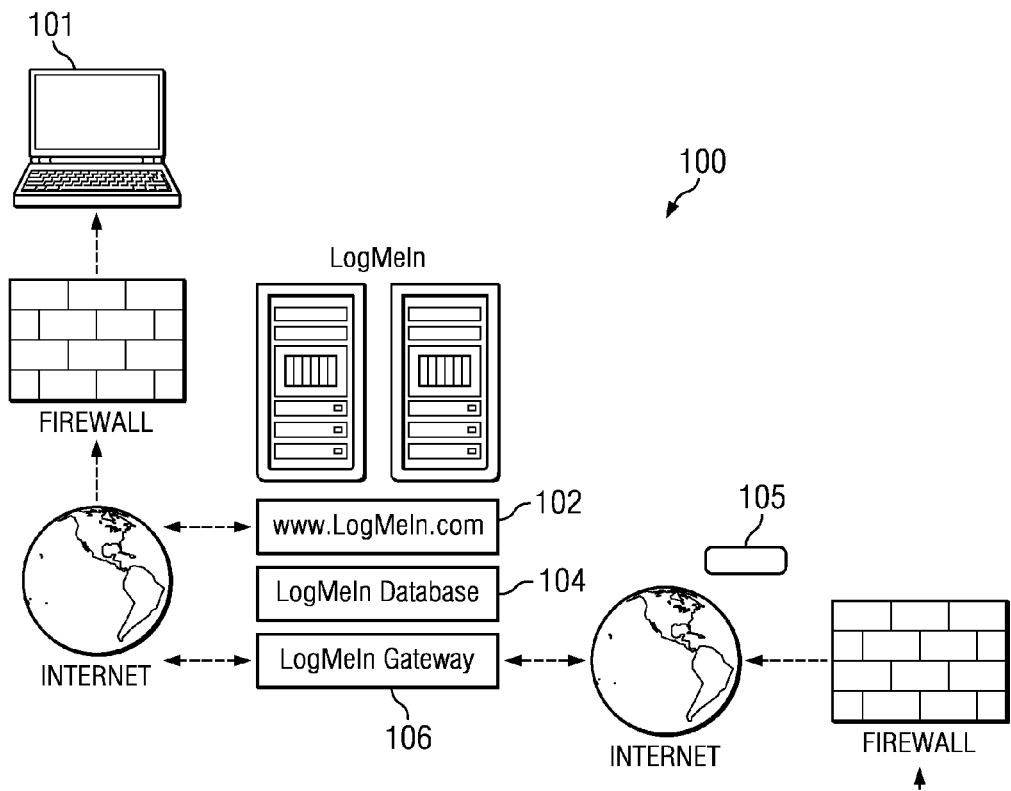
FIG. 1 depicts an extensible architecture in which exemplary aspects of the illustrative embodiments may be implemented.
Figure 1:
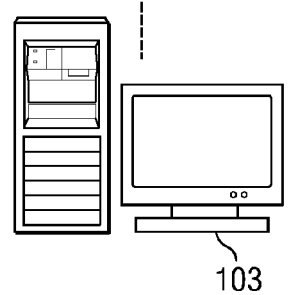

FIG. 1 illustrates a high level view of an extensible architecture 100 for use in implementing the disclosed technique by which a first participating end user 101 and a second participating end user 103 interact using a network-based quick-connect meeting service. One or both of the end users may connect to the Internet via a firewall or other gateway. In one embodiment, the meeting service is provided by a service provider entity that implements the extensible architecture. Preferably, the architecture comprises "n-tiers" that include a web server tier 102, a database tier 104, and a gateway tier 106. The web server tier 102 comprises a plurality of machines that each executes web server software, such as Apache, or the like. The web server tier provides an Internet-accessible web site (e.g., http://join.me" where Join.me™ is a trademark of the assignee, LogMeIn, Inc., all rights reserved). Preferably, the web site associated with the site domain (however designated) is available from multiple locations that collectively comprise the web server tier 102. A traffic manager product or service (not shown) may be used to direct DNS queries to the domain to a closest, least-busy machine for load balancing purposes. The database tier 104 comprises a plurality of machines that each executes database server software. The database tier provides a network-accessible data storage service for generating and storing the session codes. A session code 105 is sometimes referred to herein as a "meeting" code, as it is used to facilitate a network-based quick-connect meeting service as described herein.

A meeting code may be alphanumeric and a given number of characters, such as nine (9) digits. This is not a limitation. The code may be generated in any convenient manner, e.g., using a random number or pseudo-random number generator, by applying a hash or other cryptographic function to a data string, by applying a given mathematical operator (e.g., a concatenation, XOR, or the like) to one or more data strings, or the like. Preferably, however, the meeting code is simple and short so that it can be easily remembered and passed between and among participating end users even orally. The meeting code may also be generated from one or more device characteristics, temporal data, or the like. A plurality of meeting codes may be generated periodically as a list. As needed, a meeting code is obtained from the list. A meeting code may be uniquely associated with a particular end user for repeat use.

The gateway tier 106 comprises a plurality of machines that each executes application server software. The gateway tier provides a network-accessible connection service for establishing and maintaining connections between and among the participating end user computers. Although not shown, preferably end user computers connect to the gateway servers over secure connections, e.g., over SSL, TLS, or the like. This is not a requirement, however. The security layer is well-known.

Preferably, the infrastructure is distributed in multiple physical locations, such as multiple Internet-accessible data centers.

Figure 4:
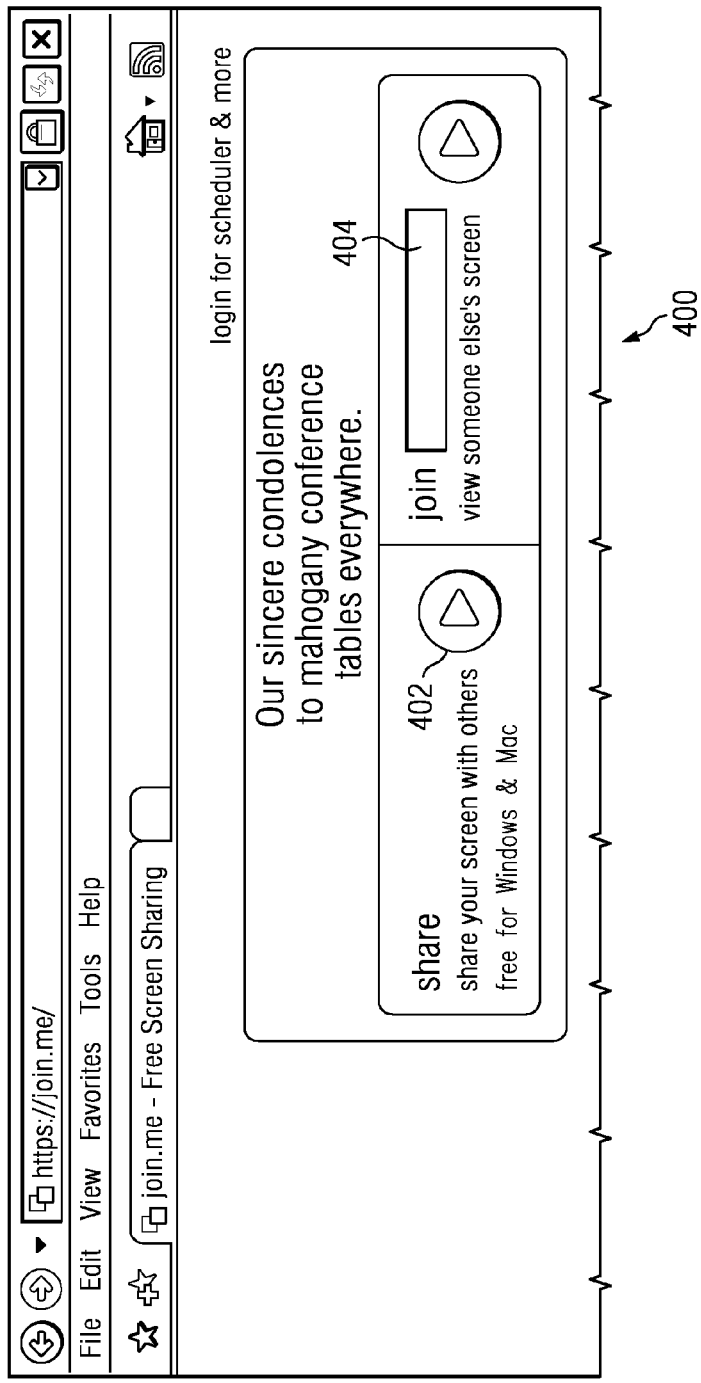
FIG. 4 is a sample display interface of the "join meeting" web-based interface.

The web site exports for display on end user devices a set of one or more web pages, such as the page 400 illustrated in FIG. 4. The single page includes a "Share" button 402 from which a first participating end user (who navigates to the page using a browser or other such rendering software) initiates a meeting. The page also includes a "Join" field 404 into which a second participating end user (an invitee to the meeting initiated by the first participating end user) enters a meeting code to "join" the meeting on-the-fly and without requirement of a registration, software download by the user, click-through, or the like. Although only first and second participating end users are described, any number of end users can collaborate within a given meeting.

In an alternative embodiment, the functions of the "Share" and "Join" pages are provided using a dedicated application that can be downloaded and executed on a participating end user device. Preferably, the application is associated with a desktop "shortcut" that can be selected to launch the application.

Figure 2:
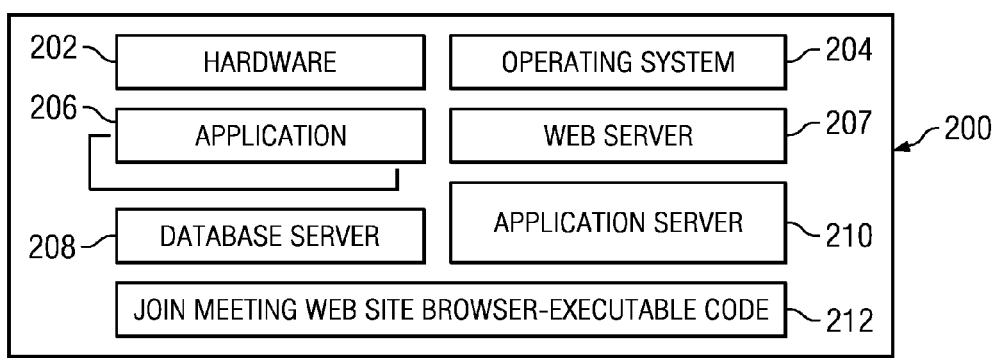
FIG. 2 is an exemplary block diagram of a machine upon which a server is implemented.

FIG. 2 is a logical representation of a machine used by the service provider. A machine 200 comprises commodity hardware (e.g., an Intel Pentium processor) 202 running an operating system kernel (such as Linux or variant) 204 that supports one or more applications 206*a-n*. Thus, a machine in the web server tier 102 executes a web server 207, a machine in the database tier 104 executes a database server 208, and a machine in the gateway tier executes an application server 210. The representation shown in FIG. 2 is a logical one, as a particular machine need not support each of the above-identified components. Stated another way, particular machines within the infrastructure typically provided dedicated functions. In the alternative, a machine in a particular tier may execute servers from multiple tiers. As also seen in FIG. 2, a particular machine also provides browser-executable code 212 that is automatically provided to a participating end user who navigates to the Web site. The code is dynamic HTML or Adobe Flash code that recognizes the invitee's intent to join the meeting (evidenced by the invitee selecting the link or entering the meeting code directly) and, in response, instructs the service to connect the invitee to the meeting. The code 212 is executed by or in association with the end user's web browser, which downloads the join meeting page (and the code 212) when he or she opens the browser to that URL.

Figure 3:
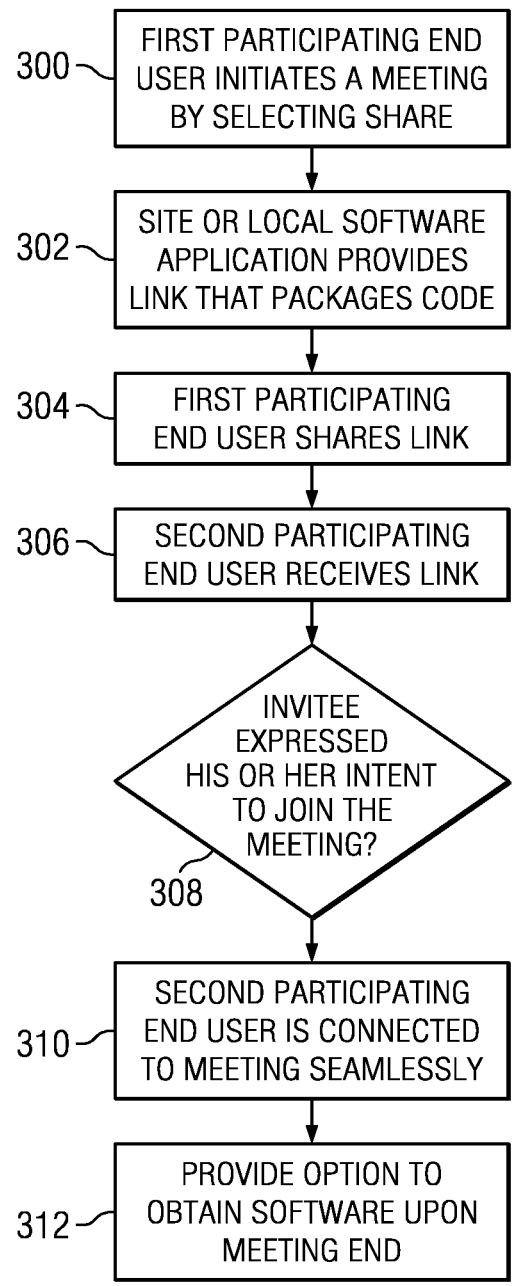
FIG. 3 is a process flow diagram illustrating an exemplary interaction to provide the quick connect "join meeting" functionality.

The "join meeting" service is now described with reference to FIG. 3. It is assumed that end users that desire to use the service have and operate computing devices (e.g., computers, mobile phone, tablet devices, or the like) that include hardware and software to enable the device to access a network, such as the public Internet, a Wi-Fi network connected to the Internet, a 3G or higher wireless network connected to the Internet, a private network, or the like. As also noted, the "join meeting" service provides the publicly-available site (such as a Web site) or a local software application from which a first participating end user initiates a "meeting," e.g., by selecting a "share" button. This is step 300. In response, and as described in more detail below, the site or local software application (running on the end user's machine) provides an HTTP link that includes a "meeting" code. This is step 302. The first participating end user then shares the link with whomever he or she desires to collaborate. This is step 304. Upon receiving the link (e.g., by e-mail, instant message, SMS, MMS, orally, or the like) at step 306, a second participating end user joins the meeting "on-the-fly" at step 308 by simply selecting the link or navigating to the site and entering the "meeting" code (in a "join" field). The service seamlessly connects the second participating end user to the meeting immediately and without requiring any registration, software download, or the like. This is step 310. Upon completing a meeting at step 312, participants are provided an option to download the local software application from which (once installed on the local computer) subsequent meetings can be initiated or joined without requiring navigation to the site itself. This completes the process.

The connectivity between or among the participating end users is provided using the above-described tiered server infrastructure to provide a highly-available, scalable "join meeting" service that is easy to use, highly reliable, and secure.

Figure 5:
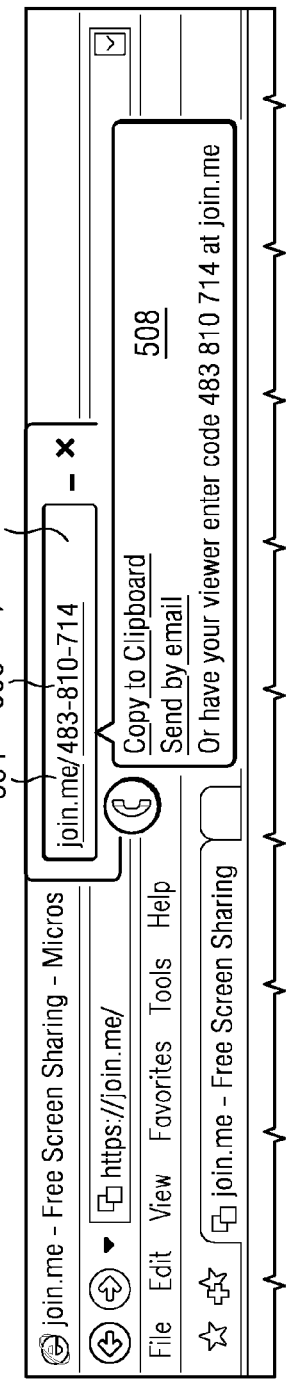
FIG. 5 is a sample display interface of a "join meeting" display control that is installed and rendered on the first participating end user's display screen after the user selects the "Share" function.

FIG. 5 illustrates a first participating end user's display after the user navigates to the "join meeting" web site and selects the Share button. If necessary, a end user machine utility is downloaded and installed in the end user's machine, e.g., as a Java applet, an ActiveX control, or as native code. The utility generates and renders a "join machine" display control 500, which is described in more detail in association with FIG. 6. The display control 500 includes a field 502 that includes a link 504 and the associated meeting code 506. An alert box 508 displays a message explaining how the user can "share" the meeting code.

Figure 6:
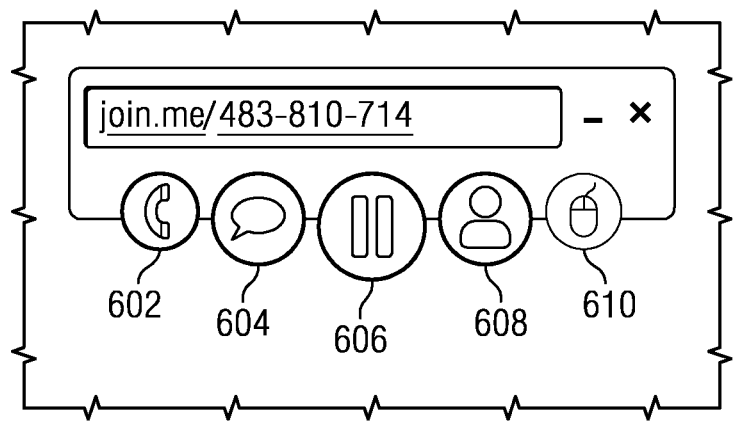
FIG. 6 illustrates the "join meeting" display control.

Referring now to FIG. 6, preferably the display control comprises a set of simple-to-use control buttons that facilitate the collaboration once the invited end user accepts the meeting. These include: get conference number 602, chat 604, share screen 606, participants 608, and share control 610. The get conference number 602 returns a system-generated conference call number that the participants can use during the meeting. A chat button enables the participants to chat with one another via the service. The share screen button 606 enables the first user to share his or her screen with a second user. When the button 606 is toggled, screen sharing is paused. The participant button 608 returns a display list of the active participants. The share control button 610 enables the first user to tender control of his or her desktop to another user.

Once the invited end user accepts the invitation (by either selecting the link provided by the service or entering the meeting code on the site interface), the end user's computer also receives the display control utility on his or her machine as well. Thus, all participants in the meeting can control the collaboration functions (via the buttons 602, 602, 606, 608 and 610).

Figure 7:
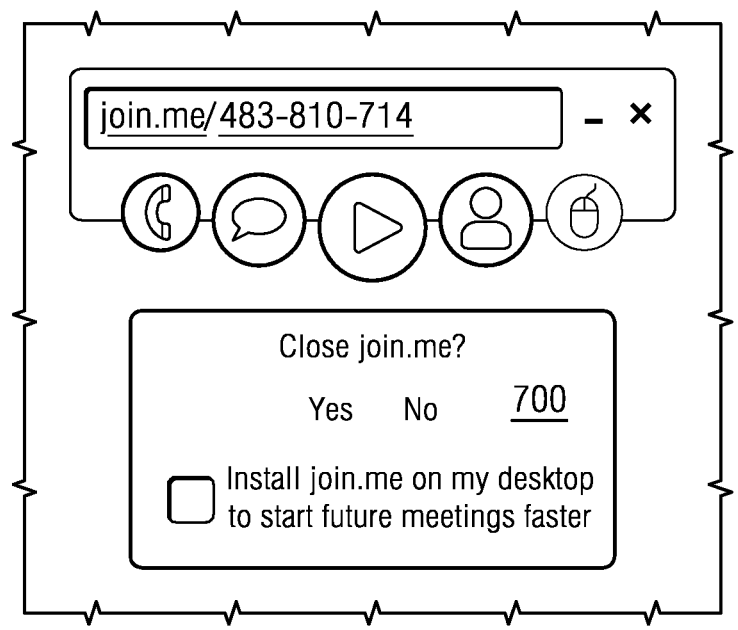
FIG. 7 illustrates an alert that is provided to the participating end user at the conclusion of a meeting.

FIG. 7 illustrates an alert that is displayed, preferably upon receipt of an indication that one of the participants desire to leave the meeting. The alert provides an option for the end user to download and install persistently the local application. If the application is not installed locally, the utility (the Java applet or ActiveX control) is delivered and installed upon each meeting invite/joinder, as the case may be.

The infrastructure provides for an unlimited number of meetings, and each meeting may include up to a large number (e.g., 250) participants. During a meeting, a particular user can chat with participants, share a system-generated conference call number, transfer files, and allow participants to control the user's computer.

In one embodiment, the first participating end user accesses the service via a desktop or laptop computer. A representative machine is a data processing system that includes a communications fabric that provides communications between a processor unit, memory, persistent storage, a communications unit, an input/output (I/O) unit, and a display. A typical data processing system includes a web browser or the like.

In another embodiment, one or more of the participating end users are mobile device users that use the techniques and infrastructure to collaborate instantly over a network. As used herein, a "mobile device user" should be broadly construed. It includes any mobile client device, e.g., a cellphone, pager, a personal digital assistant (PDA, e.g., with GPRS NIC), a mobile computer with a smartphone client, or the like. A typical mobile device is a wireless access protocol (WAP)-enabled or other similar device (e.g., an iPhone®, iPad, a Blackberry® device, or the like) that is capable of sending and receiving data in a wireless manner using the wireless or similar application protocol. Typically, WAP- (or similar) enabled devices use graphical displays and can access the Internet (or other communication network) on so-called mini- or micro-browsers, which are web browsers with small file sizes that can accommodate the reduced memory constraints of handheld devices and the low-bandwidth constraints of a wireless networks.

In another embodiment, the mobile device operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats.

Wireless device operating environments in which the subject matter may be implemented also are well-known. In a representative embodiment, a mobile device is connectable (typically via WAP) to a transmission functionality that varies depending on implementation. Examples include a 2.5 G network, a 3G network, a 3GS network, a 4G network, or the like, Of course, the subject matter herein may be implemented in other (e.g., 3G) and next-generation mobile networks and devices as well. Devices connected over Wi-Fi also may use the service. The mobile device is the physical equipment used by the end user, typically a subscriber to the wireless network. Typically, a mobile device is a 3G- (or higher) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like).

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the subject disclosure has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs on a web server (e.g., Apache) on a standard Intel hardware platform running an operating system such as Linux.

The invention may be practiced, typically in software, on one or more machines. Generalizing, a machine typically comprises commodity hardware and software, storage (e.g., disks, disk arrays, and the like) and memory (RAM, ROM, and the like). The particular machines used in the system are not a limitation of the present invention. A given machine includes network interfaces and software to connect the machine to a network in the usual manner. As described above, the subject matter may be implemented as a standalone product, or as a managed service (e.g., in an ASP model) using a set of machines, which are connected or connectable to one or more networks. More generally, the product or service is provided using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., AJAX technologies, Java applets or servlets, linkable libraries, native code, or the like, depending on platform), that provide the functionality of a given system or subsystem. As described, the product or service may be implemented in a standalone server, or across a distributed set of machines. Typically, a server connects to the publicly-routable Internet, a corporate intranet, a private network, or any combination thereof, depending on the desired implementation environment.

While given components of the system have been described separately, one of ordinary skill will appreciate that some of the functions may be combined or shared in given instructions, program sequences, code portions, and the like.

While the subject matter herein has been described in the context of a "join meeting" function, the term "meeting" should be broadly construed and extends to any form of collaboration include, without limitation, display screen sharing, remote access, remote control, file transfer, and the like. The collaboration technologies are well-known. Representative technologies include, without limitation, those available from LogMeIn, Inc. under the names LogMeIn Free, Pro, and Ignition. Once the collaboration is initiated, preferably the service attempts to enable the first and second participating end user machines to connect directly, e.g., via a peer-to-peer (P2P) connection. A technique to facilitate such P2P connectivity is described in commonly-owned U.S. Pat. No. 7,558,862; the disclosure of this patent is hereby incorporated by reference.

Enhanced features of the service may include, without limitation, having the system generate "personalized" links that a user can share to initiate the meeting, providing a meeting scheduler that end users can use to schedule future meetings, and providing a mechanism to manage end users that can act as meeting presenters.

As noted above, a meeting code may be a one-time meeting code, a code associated with an end user that can be re-used, or the like.

Preferably, and as described above, the join meeting web page embeds browser-executable software implemented in, e.g., dynamic HTML or Adobe Flash, to obviate client-side downloads and/or forms (e.g., dialog boxes to click-through) on the viewer side. All the invitee needs to do is express an intent to join the meeting by clicking on the link or entering the code.

Having described my invention, what I now claim is as follows:

What is claimed is:

1. A network-based quick-connect meeting service apparatus, comprising:

a network-accessible hardware and software infrastructure operating at a service provider domain, the network-accessible infrastructure comprising a web server tier including at least one web server executing on a hardware processor to provide a meeting service page comprising markup language code and embedded code instructions that are adapted to be automatically executed upon loading of the page, the network-accessible infrastructure enabling participating end users to collaborate with one another, where at least one participating end user operates a mobile device that can access the infrastructure and that includes a mobile application to access the meeting service apparatus;

a service application tier including at least one service application instance executing on a hardware processor in the network-accessible infrastructure;

the web server tier providing, to a browsing engine associated with a first end user, a first instance of the meeting service page, the first instance of the meeting service page including at least a first button representing a sharing function;

the web server tier further providing, to the mobile application associated with a second end user, a second instance of the meeting service page including at least a second button representing a join function, and an associated display field, the embedded code instructions being automatically executed by the mobile application associated with the second end user upon loading of the meeting service page;

the service application tier providing the first end user a control element in response to receipt at the network-accessible infrastructure of first data, the first data indicating a selection of the first button in the first instance of the meeting service page by the first end user, and wherein the control element has a meeting code associated therewith;

the service application tier being further responsive to receipt at the network-accessible infrastructure of second data, the second data indicating entry of the meeting code in the display field and selection of the second button in the second instance of the meeting service page; and the network-accessible infrastructure responsive to receipt of the second data to connect at least the first and second end users to one another without action by the second end user to register to the service application tier or to interactively download other code.

2. The apparatus as described in claim 1 wherein the meeting code is viewable in association with the control element.

3. The apparatus as described in claim 1 wherein the control element is personalized to uniquely identify the first end user.

4. The apparatus as described in claim 1 wherein the embedded code instructions are one of: dynamic HTML, and vector-based graphics code.

5. The apparatus as described in claim 1 wherein the network-accessible hardware and software infrastructure also includes a database tier including at least one database server executing on a hardware processor.

6. The apparatus as described in claim 1 wherein the network-accessible hardware and software infrastructure also includes a gateway server through which the first and second end users connect to one another.

7. The apparatus as described in claim 1 wherein the network-accessible hardware and software infrastructure attempts to enable a machine associated with the first and the mobile device associated with the second user to connect directly via a peer-to-peer connection.

8. The apparatus as described in claim 1 wherein the participating end users collaborate with one another in a collaboration that is one of: display screen sharing, file transfer, chat, remote access, and remote control.

9. The apparatus as described in claim 1 wherein the meeting code is one of: a one-time unique code generated upon receipt of the request, a code obtained from a list of pre-generated meeting codes, a code uniquely assigned to a participating end user, and a code packaged in association with a link.

* * * * *